UNITED STATES PATENT OFFICE.

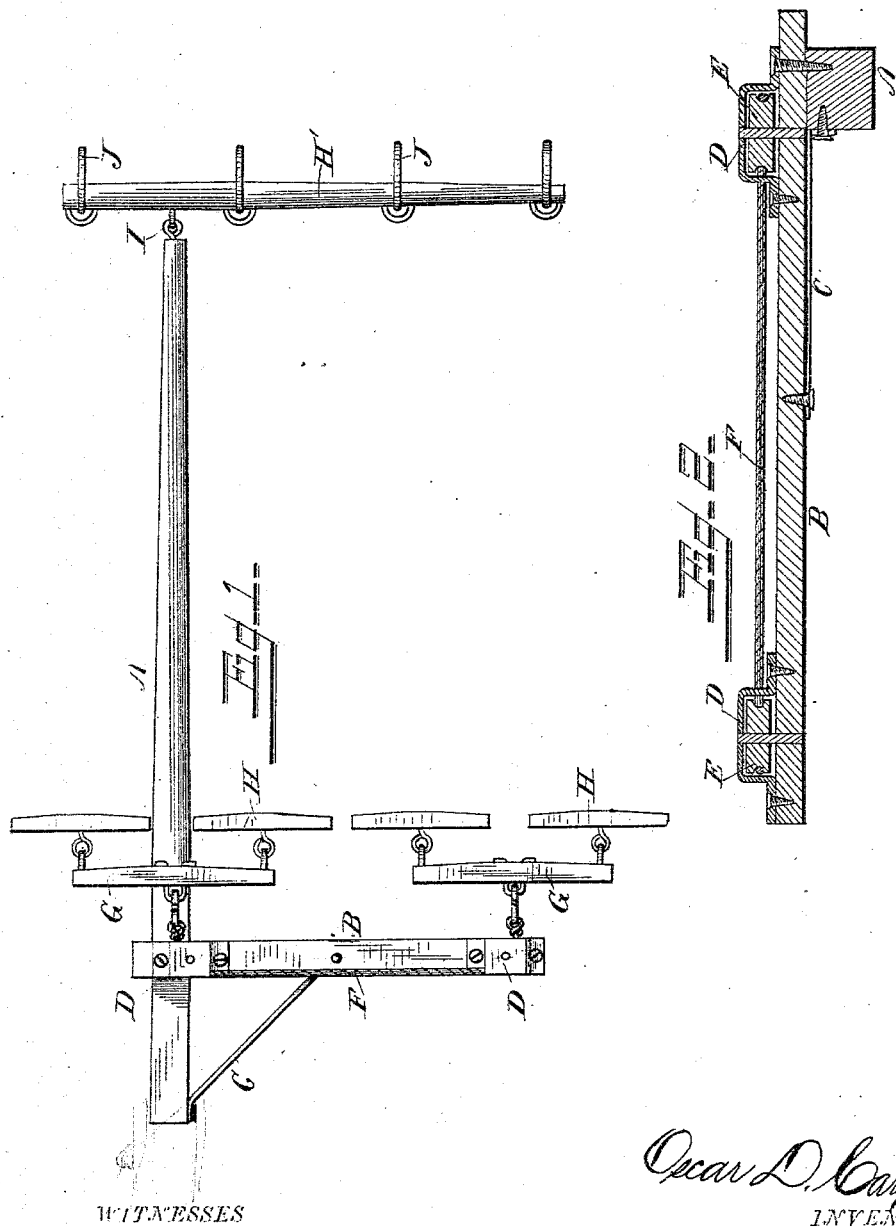

OSCAR D. CARPENTER, OF NORTH FREEDOM, WISCONSIN.

DRAFT-EQUALIZER.

SPECIFICATION forming part of Letters Patent No. 302,983, dated August 5, 1884.

Application filed January 9, 1884. (No model.)

*To all whom it may concern:*

Be it known that I, OSCAR D. CARPENTER, a citizen of the United States, residing at North Freedom, in the county of Sauk and State of Wisconsin, have invented a new and useful Draft-Equalizer, of which the following is a specification, reference being had to accompanying drawings.

This invention relates to draft-equalizers, and has for its object to provide a device which will equalize the draft of four horses when working abreast on harvesters and other machines where they are needed.

With this object in view the said invention consists in attaching the horses to double-trees connected to each end of a chain running over suitable pulleys, the draft of the horses acting to draw the chain over the pulleys, and thus equalizing the weight of the harvester or other machine to which they may be attached, all as hereinafter set forth, and particularly pointed out in the claims.

In the accompanying drawings, Figure 1 is a plan view of my improved equalizer. Fig. 2 is a transverse sectional view through the evener.

Like letters refer to corresponding parts in the several figures.

Referring to the drawings, A designates the pole, attached to the harvester or other machine in the usual manner, and provided with an evener, B, secured at its rear end and projecting outwardly at right angles thereto, a brace-rod, C, being used to connect the outer end with the pole, in order to stiffen and support the same.

D designates castings or plates secured to the top of the evener at each end, and having pulleys E journaled therein, a chain or rope, F, connecting the pulleys, the ends of said chain or rope being attached to double-trees G, to which single-trees H are connected in the usual manner.

At the front end of the pole A is attached the neck-yoke H' by an eyebolt, I, said neck-yoke having rings J secured thereon, the single-trees and rings being connected together, in the usual manner, by traces K, the horses working between the traces, as will be seen.

The operation of my invention will be readily understood from the foregoing description, taken in connection with the annexed drawings. The horses are connected to the single-trees, and as they draw on the same the ends of the chain or rope will be drawn through the pulleys, thereby permitting a free yielding movement for the draft of the horses. Since the chain is drawn from one side to the other, the draft will be equalized, so that each horse will be compelled to pull his share of the load.

It will be seen that the above-described device provides a simple and efficient equalizer to be used in working four horses abreast on harvesters and other machines where they are needed, each pair of horses being connected to one end of the chain, and drawing the same from one side to the other, so that the strain on each horse will be equal. The parts of the equalizer are securely connected together, the evener being supported and braced in position, and the pulleys and chain being attached in such a manner that they are not in danger of being disarranged or set out of order.

It will also be seen that the equalizer brings the horses in a convenient position for handling in an easy manner, so as to be under perfect control.

Having described my invention, I claim—

1. In a draft-equalizer, the combination, with the pole A, of an evener attached to the same at one end and extending outward at right angles thereto, brace-rod C, a pair of pulleys mounted on the evener at each end, a chain or rope connecting the pulleys, double-trees detachably secured to the ends of the chain or rope, and single-trees attached to the double-trees, arranged and operating for the purpose set forth.

2. In a draft-equalizer, the combination, with the pole A, of an evener, B, attached to the same, brace-rod C, castings or plates D, pulleys E, chain or rope F, double-trees G, single-trees H, neck-yoke H', rings I, and traces K, as set forth.

In testimony that I claim the foregoing as my own I have hereto affixed my signature in presence of two witnesses.

OSCAR D. CARPENTER.

Witnesses:
R. G. EVENDEN,
W. I. CARPENTER.